(12) United States Patent
Bruecken

(10) Patent No.: US 7,287,005 B1
(45) Date of Patent: Oct. 23, 2007

(54) METHOD FOR SUPPLEMENTING DESCRIPTORS FOR ONLINE BANKING TRANSACTION STATEMENTS

(75) Inventor: Carl Bruecken, Leesburg, VA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 416 days.

(21) Appl. No.: 09/917,676

(22) Filed: Jul. 31, 2001

Related U.S. Application Data

(60) Provisional application No. 60/301,453, filed on Jun. 29, 2001.

(51) Int. Cl.
G06F 17/30 (2006.01)
G06F 15/00 (2006.01)
G06F 17/00 (2006.01)
G07F 7/00 (2006.01)
G06Q 30/00 (2006.01)

(52) U.S. Cl. .................... 705/27; 705/26; 705/27; 705/30; 705/31; 705/32; 705/33; 705/34; 705/35; 705/36; 705/37; 705/70; 707/100; 707/101; 707/102; 707/103 R; 707/103 Y; 707/103 X; 707/103 Z; 707/104.1; 715/500; 715/509

(58) Field of Classification Search ............ 705/40, 705/75, 30–37, 26–7, 70; 902/26; 715/500, 715/509; 707/100–104.1
See application file for complete search history.

(56) References Cited

U.S. PATENT DOCUMENTS

| | | | |
|---|---|---|---|
| 4,961,158 A | | 10/1990 | Sussman |
| 5,608,874 A | * | 3/1997 | Ogawa et al. ............. 709/246 |
| 5,682,027 A | * | 10/1997 | Bertina et al. ............. 235/380 |
| 5,710,889 A | * | 1/1998 | Clark et al. ............... 235/379 |
| 5,903,881 A | * | 5/1999 | Schrader et al. ........... 705/42 |
| 5,933,816 A | * | 8/1999 | Zeanah et al. ............. 705/35 |
| 5,943,656 A | * | 8/1999 | Crooks et al. ............. 705/30 |
| 5,995,965 A | | 11/1999 | Experton |
| 6,014,648 A | | 1/2000 | Brennan |
| 6,055,567 A | * | 4/2000 | Ganesan et al. ........... 709/219 |
| 6,182,052 B1 | * | 1/2001 | Fulton et al. ............. 705/26 |
| 6,202,054 B1 | * | 3/2001 | Lawlor et al. ............ 705/42 |
| 6,332,131 B1 | * | 12/2001 | Grandcolas et al. ....... 705/35 |
| 6,341,353 B1 | | 1/2002 | Herman et al. |
| 6,354,490 B1 | * | 3/2002 | Weiss et al. ............... 235/379 |
| 6,442,532 B1 | * | 8/2002 | Kawan .................... 705/35 |
| 6,446,048 B1 | * | 9/2002 | Wells et al. ............... 705/35 |
| 6,493,685 B1 | * | 12/2002 | Ensel et al. ............... 705/40 |
| 6,505,772 B1 | * | 1/2003 | Mollett et al. ............ 235/379 |

(Continued)

OTHER PUBLICATIONS

*Quicken Setup Guide*; Intuit Inc. 2001; 96 pages.

*Primary Examiner*—Bradley Bayat
(74) *Attorney, Agent, or Firm*—Fish & Richardson P.C.

(57) ABSTRACT

Personalized transaction identification information is provided by a user to supplement the generic transaction banking information received from the user's electronic banking service. The personalized transaction identification information is maintained by the user or the user's Internet Service Provider (ISP) or host. At the time of the transaction or later, details about the transaction are entered by the user into a personal digital assistant (PDA) or online. Subsequently, when the user downloads his banking information, the downloaded banking material is matched with the stored personalized transaction identification information. As a result, the information provided to the user about a transaction is more comprehensive since information beyond check number and amount are provided.

18 Claims, 8 Drawing Sheets

U.S. PATENT DOCUMENTS

| | | | |
|---|---|---|---|
| 6,513,019 B2 * | 1/2003 | Lewis | 705/35 |
| 6,543,683 B2 | 4/2003 | Hoffman | |
| 6,701,315 B1 * | 3/2004 | Austin | 707/10 |
| 6,704,714 B1 * | 3/2004 | O'Leary et al. | 705/39 |
| 6,760,414 B1 * | 7/2004 | Schurko et al. | 705/36 R |
| 6,792,422 B1 * | 9/2004 | Stride et al. | 707/6 |
| 6,842,772 B1 * | 1/2005 | Delaney et al. | 709/206 |
| 6,856,974 B1 * | 2/2005 | Ganesan et al. | 705/40 |
| 6,931,599 B1 * | 8/2005 | Korenshtein | 715/762 |

* cited by examiner

| AOL's Data | | | | Bank's Data | | |
|---|---|---|---|---|---|---|
| Check # | Amount | Description | Purpose/Category | Check # | Description | Amount |
| 1470 | $12.00 | Girl Scout Cookies | Tax deductible | 1470 | Paid Check 1470 | $12.00 |
| 1475 | $35.00 | Rx | Medical | 1475 | Paid Check 1475 | $35.00 |
| 1498 | $225.00 | Visa Bill | Food | 1498 | Paid Check 1498 | $225.00 |
| 1499 | $90.00 | Groceries | | 1499 | Paid Check 1499 | $90.00 |
| 1502 | $125.00 | Dr. Ortega | Medical | 1502 | Paid Check 1502 | $125.00 |
| 1507 | $450.00 | Child Care | Food | 1507 | Paid Check 1507 | $450.00 |

FIG. 3A

| Date | Description | Amount | Balance |
|---|---|---|---|
| 04/05/01 | Paid Check 1507 | $450.00 | $1576.50 |
| 04/02/01 | Dividend | $2.50 | $2026.50 |
| 03/30/01 | Automatic Payment | $50.75 | $2024.00 |
| 03/30/01 | Transfer to Savings | $200.00 | $2074.00 |
| 03/28/01 | Paid Check 1502 | $125.00 | $2274.75 |
| 03/21/01 | ATM Withdrawal | $100.00 | $2399.75 |
| 03/15/01 | Deposit | $200.00 | $2499.75 |
| 03/15/01 | Paid Check 1499 | $90.00 | $499.75 |
| 03/12/01 | Automatic Payment | $110.25 | $589.75 |
| 03/09/01 | Paid Check 1498 | $225.00 | $775.00 |

*FIG. 3B*

| Check No. | Description | Amount | Purpose/Category |
|---|---|---|---|
| 1507 | Childcare in May | $450.00 | Tax deductible |
| 1502 | Dr. Ortega | $125.00 | Medical |
| 1499 | Groceries | $90.00 | Food |
| 1498 | VISA | $225.00 | |
| 1475 | Rx | $35.00 | Medical |
| 1470 | Girl Scout Cookies | $12.00 | Food |

FIG. 3C

| ISP Data | | | | | Bank Data | | | | |
|---|---|---|---|---|---|---|---|---|---|
| Check No. | Amount | Description | Purpose/ Category | Balance | Date | Description | Amount | Balance | Audit |
| 1507 | $450.00 | Childcare in May | Tax deductible | $180.10 | 04/05/01 | Paid Check 1507 | $450.00 | $1576.50 | 1396.40 |
| | | | | | 04/02/01 | Dividend | $2.50 | $2026.50 | |
| | | | | | 03/30/01 | Automatic Payment | $50.75 | $2024.00 | |
| | | | | | 03/30/01 | Transfer to Savings | $200.00 | $2074.00 | |
| 1502 | $125.00 | Dr. Ortega | Medical | $630.10 | 03/28/01 | Paid Check 1502 | $125.00 | $2274.75 | 1644.65 |
| | | | | | 03/21/01 | ATM Withdrawal | $100.00 | $2399.75 | |
| | | | | | 03/15/01 | Deposit | $200.00 | $2499.75 | |
| 1499 | $90.00 | Groceries | Food | $755.10 | 03/15/01 | Paid Check 1499 | $90.00 | $499.75 | (255.35) |
| | | | | | 03/12/01 | Automatic Payment | $110.25 | $589.75 | |
| 1498 | $225.00 | VISA | | $845.10 | 03/09/01 | Paid Check 1498 | $225.00 | $775.00 | (70.10) |
| 1475 | $35.00 | Rx | Medical | $1070.10 | | | | | |
| 1470 | $12.00 | Girl Scout Cookies | Food | $1105.10 | | | | | |

*FIG. 3D*

METHOD FOR SUPPLEMENTING DESCRIPTORS FOR ONLINE BANKING TRANSACTION STATEMENTS

This application claims the benefit of U.S. Provisional Application No. 60/301,453, filed Jun. 29, 2001.

TECHNICAL FIELD

This invention relates to online banking, and in particular, to providing descriptors to supplement online banking statements.

BACKGROUND

Online banking permits customers to access and execute a host of banking services from a personal computer capable of communicating with a bank's computers. For customers with high comfort levels with technology and recent technological advances, the ease of 24 hour banking without travel time or use of a public banking site, (e.g., an automated teller machine (ATM) or a physical bank) is a reality. Additionally, technological advances continue to further simplify online banking. Typical online services include checking account balances, transferring funds among accounts, and paying bills electronically. Online banking access is usually client-based or Internet-based. For client-based access, customers use money management software and their own computers to access the bank. For Internet-based access, customers access the bank through a connection to the Internet, such as through an Internet Service Provider (ISP). In an effort to enhance portability for consumers and to maintain low costs for the financial institutions, Internet-based online access is used with increasing frequency.

Online banking offers certain advantages over traditional banking, such as making service available 24 hours a day, 7 days a week; providing timely execution and confirmation of transactions; and providing a growing range of available transactions, such as mortgage applications, equity loans, and car loans.

SUMMARY

Personalized transaction identification information is provided by a user to supplement the generic transaction banking information otherwise made available by the user's electronic banking service. The personalized transaction identification information may be maintained by the user or the user's ISP or host. At the time of the transaction or later, the user enters additional details about the transaction using, for example, a personal digital assistant (PDA) or a keypad. Subsequently, when the user downloads banking information when connected to the bank through the user's Internet content provider or host, the downloaded banking material is matched with the personalized transaction identification information stored on the host. As a result, the information provided to the user about a transaction is more comprehensive since information beyond check number and amount are provided.

In one general aspect, maintaining and matching personalized transaction identification information for supplementing descriptors for online banking transaction statements includes entering personalized transaction identification information about a transaction using an input device, maintaining the personalized transaction identification information, and matching the personalized transaction identification information with online banking transaction information. Personalized transaction identification information may include, for example, a description of a purchase, a check number, and an amount. The personalized transaction identification information may be matched by downloading bank transaction information and accessing the stored personalized transaction identification information. Additionally, the matched information may be used to audit balance information.

Implementations may include one or more of the following features. For example, the personalized transaction identification information may be entered contemporaneously with the transaction or subsequent to the transaction. Additionally or alternatively, the input device may be a keypad or a PDA. Personalized transaction identification information may be stored at a host, at a third party storage facility accessible by an ISP, or at an ISP. Personalized transaction identification information may be transferred to the host using a transfer protocol, such as infrared (IR) beaming or a synchronizing method.

In another general aspect, maintaining and matching personalized transaction identification information for supplementing descriptors for online banking transaction statements includes receiving personalized transaction identification information about a transaction from an input device; maintaining the personalized transaction identification information; and matching the personalized transaction identification information with online banking transaction information.

Implementations may include one or more of the following features. For example, personalized transaction identification information may be received from an input device using a transfer protocol that may be, for instance, infrared (IR) beaming or a synchronizing method. Additionally or alternatively, personalized transaction identification may be stored at a host, at a third party storage facility accessible by an ISP, or at an ISP.

In another general aspect, storing and displaying personalized transaction identification information for supplementing descriptors for online banking transaction statements includes entering personalized transaction identification information using an input device; transferring the personalized transaction identification information from the input device through an interface to a storage device; maintaining the personalized transaction identification information on the storage device; accessing the personalized transaction identification information through an interface to user selections; and displaying the personalized transaction identification information.

Implementations may include one or more of the following features. For example, the storage device may be a host, an ISP, or a third party storage device accessible through an interface to an ISP. Additionally or alternatively, the transfer protocol may be a synchronizing method. Accessing the personalized transaction identification information may include providing an interface responsive to user selection to review, edit, supplement, or revise the personalized transaction identification information.

The details of one or more implementations are set forth in the accompanying drawings and the description below. Other features and advantages will be apparent from the description and drawings, and from the claims.

BRIEF DESCRIPTION OF DRAWINGS

FIG. 3A is a table reflecting information stored/maintained by the financial institution and the host ISP.

FIG. 3B is a table reflecting information maintained by the financial institution and accessed by the user.

FIG. 3C is a table reflecting personalized transaction identification information entered by a user that may be maintained at a host or other storage device.

FIG. 3D is a table reflecting the personalized transaction identification information matched with information maintained by a financial institution along with an audit column comparing the balance information provided about the personalized transaction identification information and the information maintained by the financial institution.

Like reference symbols in the various drawings indicate like elements.

DETAILED DESCRIPTION

Usability and readability of accessible online banking information is enhanced as a result of a user's data entry so that more information about a transaction is available to a user when reviewing downloaded financial data. For instance, the personal transaction identification information regarding one or more commercial transactions may be provided by the user and maintained by the host, which may be, for example, an ISP. As a result, the host can access the details to complete missing description information, provide more accurate real-time balances, and provide auditing data.

Figure 1:
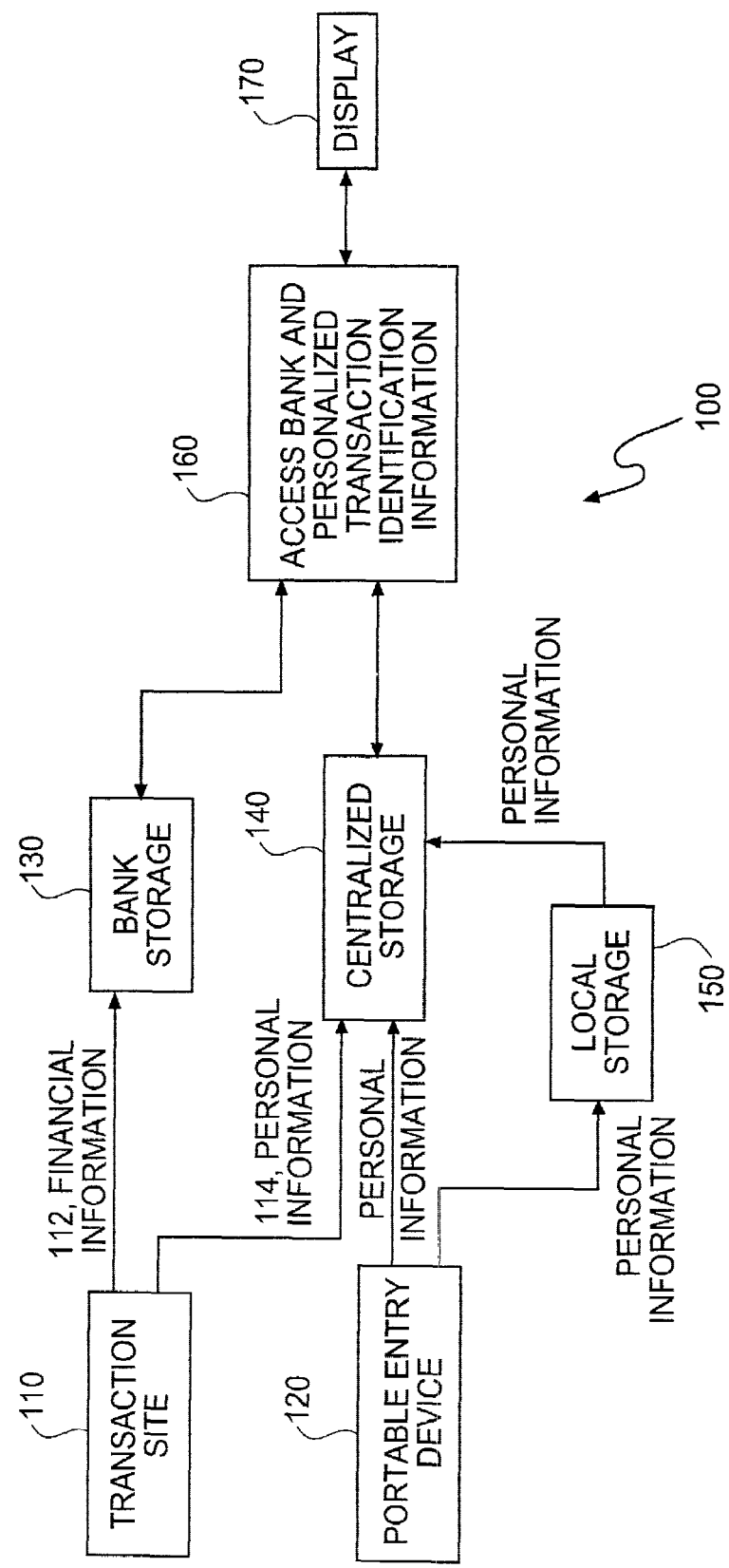
FIG. 1 is a block diagram of a system for providing supplemental descriptors for online banking transaction statements.

Referring to FIG. 1, a system 100 may be used to provide supplemental descriptors for online banking transaction statements. At a transaction site 110, a user engages in a transaction for which there is financial information and personal information. When the transaction is complete, the financial information 112 is sent by the merchant (not shown) to the bank storage 130. The personal transaction identification information 114, if any was entered at the transaction site 110 by the user, is sent to centralized storage 140, which may be, for instance, a host, an ISP, or a third party storage device accessible through an interface to an ISP. Alternatively, the user may use a portable entry device 120 to enter personalized transaction identification information 114, which is sent to centralized storage 140 directly or through local storage 150. At a later time (160), the user accesses the financial information stored in the bank storage 130 and the personalized transaction identification information maintained in centralized storage 140. Subsequently, the financial information from the bank and the personalized transaction identification information are displayed by a display 170.

Figure 2:
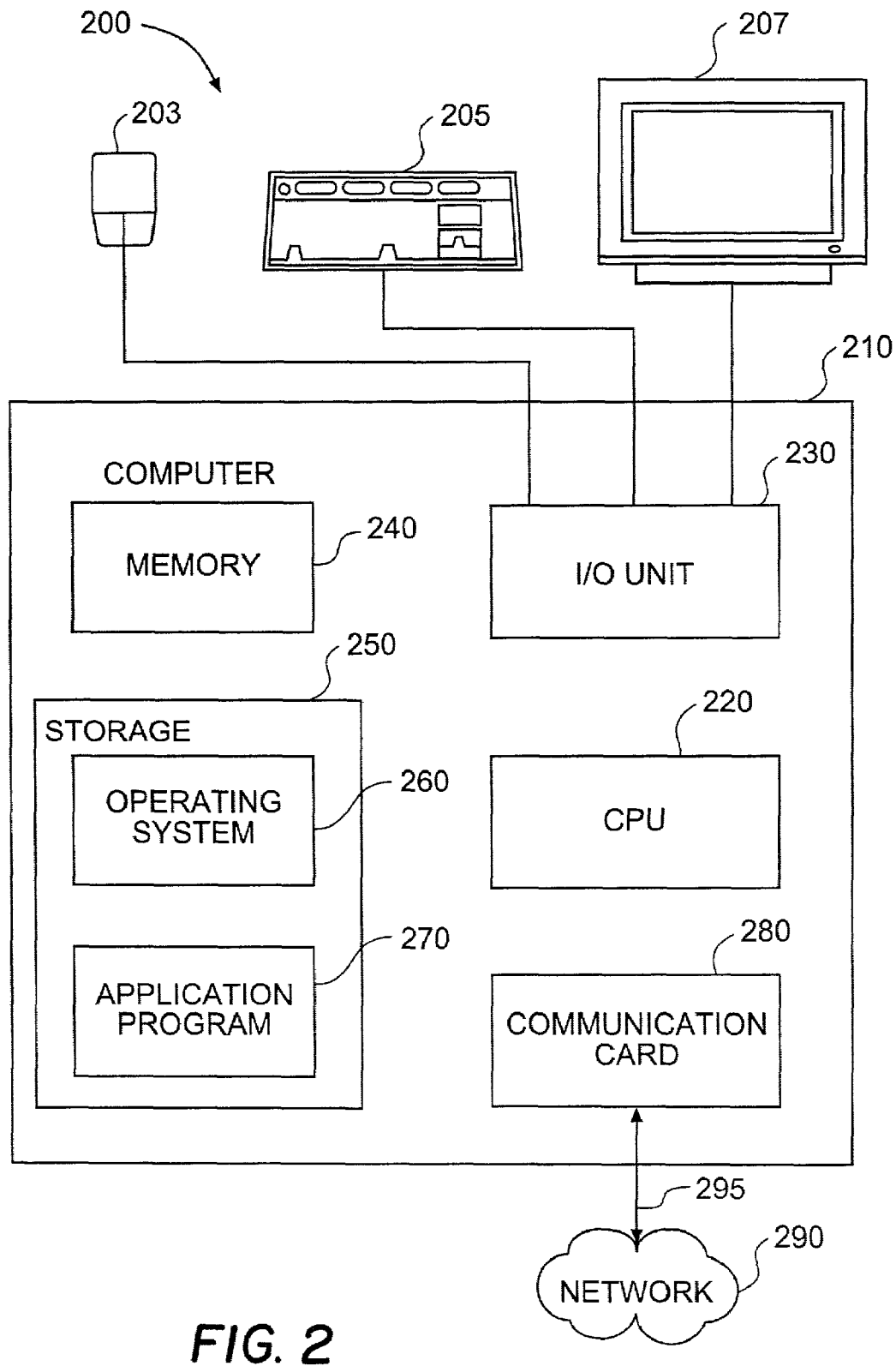
FIG. 2 is a block diagram of an example of a general purpose computer system for use in supporting the system of FIG. 1.

Referring to FIG. 2, bank and personalized transaction identification information may be accessed and displayed using an exemplary computer system 200 that also may be used to enter, maintain, and/or access personalized transaction identification information for use in providing supplemental descriptors for online banking transaction statements. As shown, the system 200 includes various input/output (I/O) devices (e.g., mouse 203, keyboard 205, and display 207) and a general purpose computer 210 having a central processor unit (CPU) 220, an I/O unit 230, a memory 240, and a storage 250 that stores data and various programs such as an operating system 260 and one or more application programs 270. Computer system 200 also typically includes some sort of communications card or device 280 (e.g., a modem or a network adapter) for exchanging data with a network 290 through a communications link 295 (e.g., a telephone line, a wireless network link, or a cable network). Other examples of system 200 include a workstation, a server, a device, a component, other equipment, or some combination of these elements capable of responding to and executing instructions in a defined manner.

FIG. 3A illustrates information 300 typically downloaded from the financial institution and personalized transaction identification information 305 that a consumer may elect to enter and maintain on a host that is physically or logically distinct from the financial institution. The information 300 includes, for example, the check number, a generic description of the check, and the amount of the check. The personalized transaction identification information 305 includes, for example, the check number, the amount of the check, and a specific description of the transaction. This personalized transaction identification information may be maintained locally or at a third party storage facility accessible by the host. The personalized transaction identification information may be used to supplement the details of a particular transaction. For instance, personalized transaction identification information specifying the items purchased in a particular transaction can assist in record keeping, such as, for example, annual tax preparation, budgeting, and monitoring of expenses. Other possible uses of personalized transaction identification information include verifying or monitoring account balances when a running balance is provided, or obtaining a measure of actual versus projected spending.

FIG. 3B provides an example of the information maintained by the bank and accessed by the user. The bank information typically available through online banking provides very little detail concerning each transaction. Generally, there is a date, a generic transaction type or check number, and an amount. There also may be a running balance associated with the bank information or some generic description of the merchant provided by the merchant or bank (not shown).

FIG. 3C provides an example of user-supplied personalized transaction identification information that may be maintained at a host or other storage device. As is evident from FIG. 3C, the information entered by the user and maintained by the host represents a more detailed picture of the purpose of a particular transaction. For instance, line 1 of FIG. 3C indicates that Check No. 1507 was written for "Childcare in May." In contrast, for example, in the information maintained by the bank, the only information available about Check No. 1507 in FIG. 3B is the amount, $450.00. Other personalized transaction identification information that may be maintained includes, for example, items purchased, payee, purpose, account number, and reference number.

FIG. 3D is a table reflecting the personalized transaction identification information matched with bank information and an audit column. The audit data compare the balance information provided about the personalized transaction identification information and the bank information.

Figure 4:
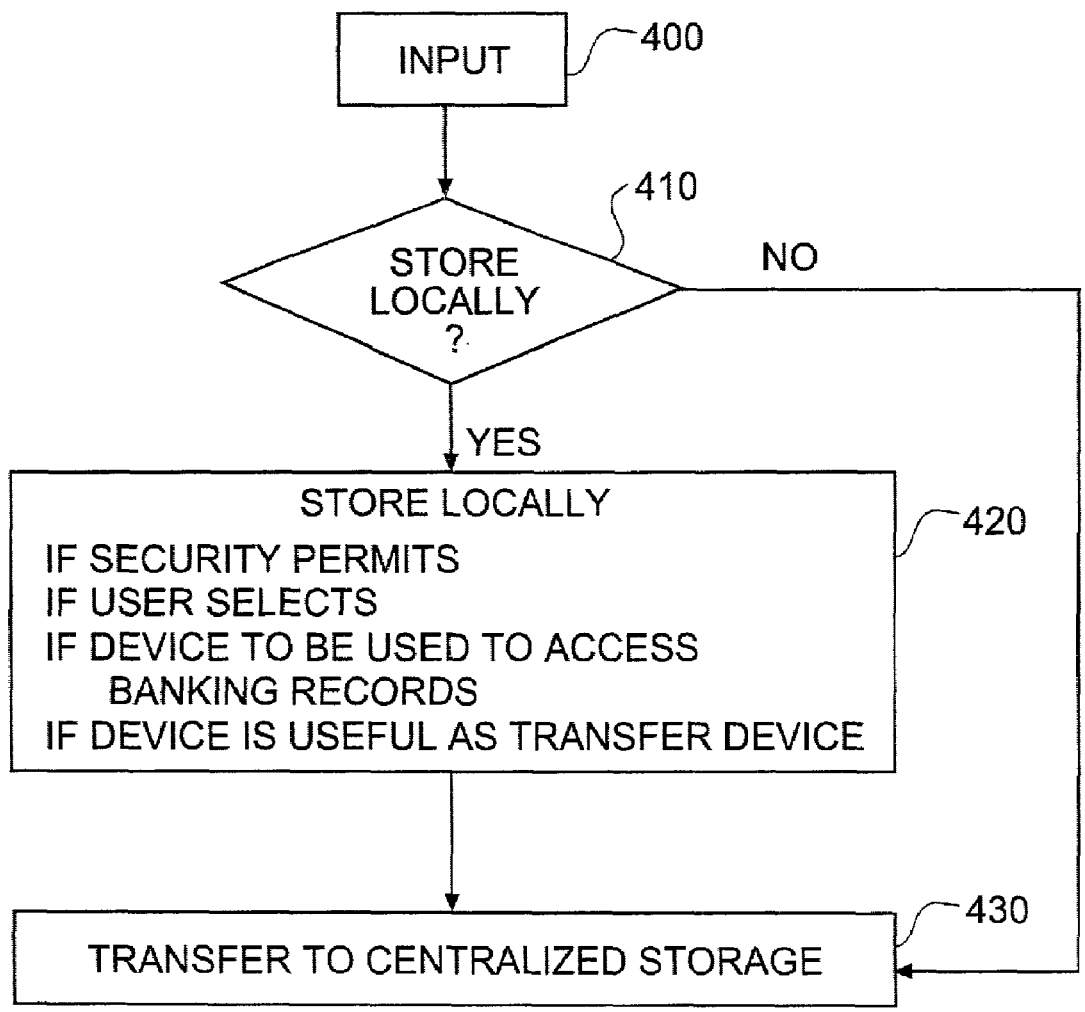
FIG. 4 is a flowchart depicting the process by which the personalized transaction identification information is entered and transferred to centralized storage.

Referring to FIG. 4, a user may enter personalized transaction information, while, for example, engaging in a checking transaction. At the time of the transaction, the user enters personalized transaction identification information about the transaction through an input device such as a PDA device or a keypad located at the transaction site (step 400). Conversely, or in addition, the personalized transaction identification information may be entered subsequently from a location remote to the transaction site using, for example, the same or different PDA device or some other machine. Personalized transaction identification information that a user may enter includes, for example, check number, amount, and description, or other information described with respect to FIG. 3B.

Next, a determination is made as to whether the information should be stored locally or remotely (step 410). In general, information is stored locally if security permits, if the user selects local storage, if the device is to be used to access bank records, or if the device is useful as a transfer device (step 420). Otherwise, the information is stored remotely (step 430) at, for example, the host or another standalone device. For example, when a PDA is used to enter the personalized transaction identification information, the personalized transaction identification information may be maintained by the PDA and/or transferred to a storage device, such as the host or another standalone device. Data transfer can occur by any number of known transfer protocols, including IR beaming and other synchronizing methods.

Figure 5:
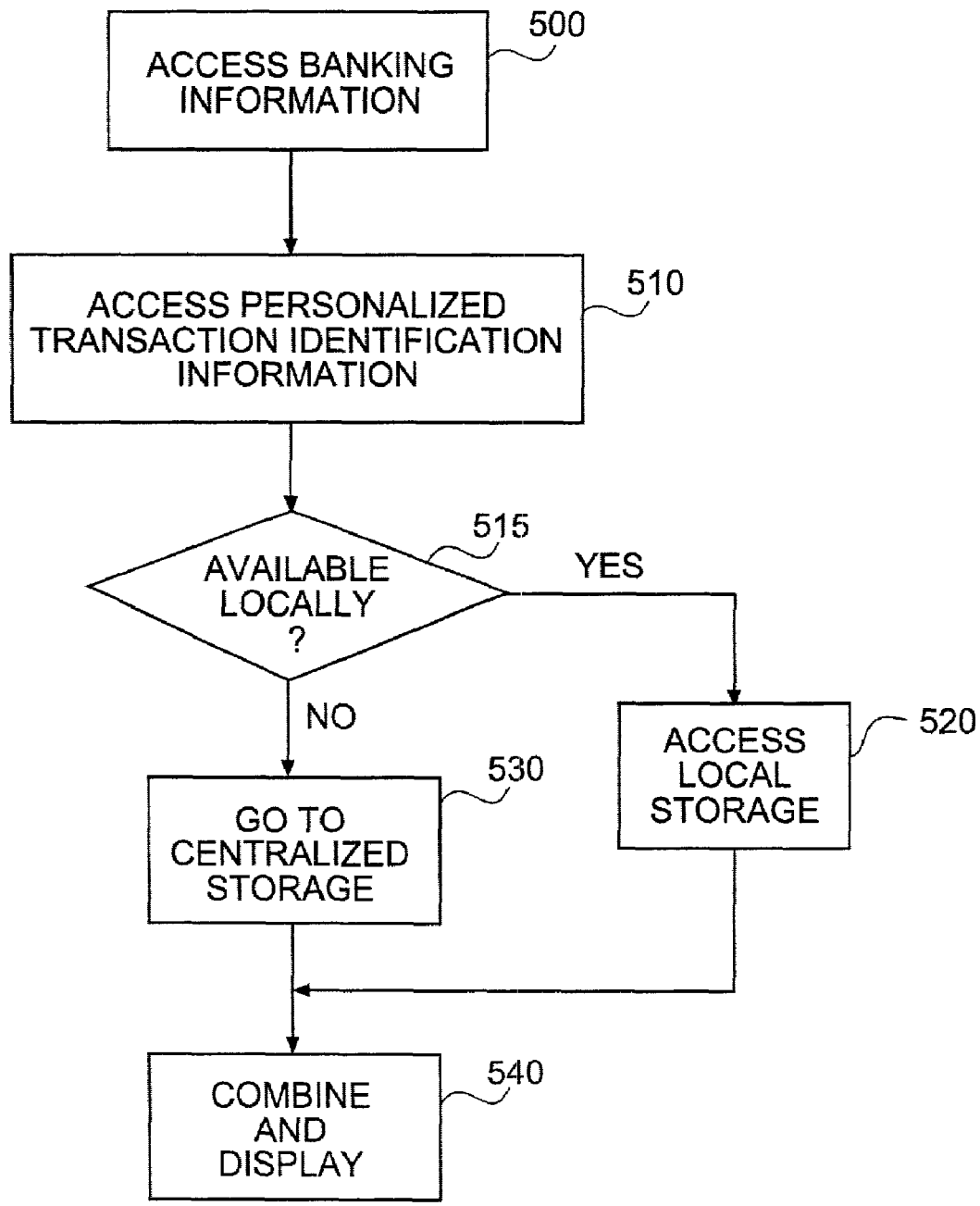
FIG. 5 is a flowchart depicting the process by which the personalized transaction identification information is accessed by the consumer and combined with the information stored/maintained by the financial institution.

Referring to FIG. 5, at a later point in time, the user, while connected to the host, may to access his online banking statement (step 500). The transaction information is received from the bank and is matched up with the personalized transaction identification information from the various storage devices (step 510). If the information is available locally (step 515), it is accessed from local storage (step 520). Otherwise, it is accessed from centralized storage (step 530), such as at the host and/or another standalone device. The personalized transaction identification information then is combined with other information and displayed (step 540). The personalized transaction identification information may provide, for example, descriptions lacking in the online banking statement.

In general, the personalized transaction identification information is accessed through an interface responsive to user selection. A user may elect to review, edit, supplement, or revise the personal transaction identification information through the interface.

A number of implementations have been described. Nevertheless, it will be understood that various modifications may be made. For example, the personalized transaction identification information may be entered using a stylus or other input instrument, and may be scanned or digitized. Other implementations may include devices having Internet access themselves, such as PDAs, cell phones, and pagers, or a "smart card" device for use with standalone consoles for providing current detailed financial information. Also, although described with respect to personalized transaction identification information, the described techniques may be applied to other transaction information. Accordingly, other implementations are within the scope of the following claims.

The invention claimed is:

1. A method for maintaining and matching personalized transaction identification information for supplementing descriptors for online banking transaction statements for a bank account, the method comprising:

receiving personalized transaction identification information about a transaction to purchase goods between a user and a provider of the goods or a transaction to purchase services between the user and a provider of the services, the personalized transaction identification information being entered by the user of the bank account using an input device, wherein the personalized transaction identification information includes a textual description of at least one of the goods, the services, the provider of the goods, and the provider of the services, the textual description including information in addition to a check number, a payee name, and a check amount;

storing the personalized transaction identification information at the input device or a user data store local to the user;

accessing the personalized transaction identification information from the input device or the user data store;

accessing online banking transaction information from a bank data store maintained by a bank that is physically distinct from the input device or the user data store;

using at least one of the check number or the check amount to match the personalized transaction identification information with the online banking transaction information; and presenting to the user a table that includes the online banking transaction information obtained from the bank and the personalized transaction identification information obtained from the input device or the user data store that is physically distinct from the bank, the table having at least one entry for each transaction, the entry identifying the check number, the payee name, the check amount, a date and a purpose of the transaction associated with the check number.

2. The method of claim 1 wherein receiving the personalized transaction identification information comprises receiving personalized transaction identification information that is entered by the user contemporaneously with the transaction.

3. The method of claim 1 wherein receiving the personalized transaction identification information comprises receiving personalized transaction identification information that is entered by the user subsequent to the transaction.

4. The method of claim 1 wherein the input device comprises a keypad.

5. The method of claim 1 wherein the input device comprises a PDA.

6. The method of claim 1 further comprising transferring the personalized transaction identification information from the input device to a host using a transfer protocol.

7. The method of claim 6 wherein the transfer protocol comprises infrared (IR) beaming.

8. The method of claim 6 wherein the transfer protocol comprises a synchronizing method.

9. The method of claim 1 wherein the personalized transaction identification information comprises at least one of a description of a purchase, and a purpose associated with the purchase.

10. The method of claim 1 wherein using the at least one of the check number or the check amount to match the personalized transaction identification further comprises generating audit data, the audit data providing a differential value between personalized account balance data corresponding to the personalized transaction identification information and online banking account balance data.

11. The method of claim 1, wherein the user is a party to the transaction.

12. The method of claim 1, wherein receiving personalized transaction identification information about a transaction includes receiving a first identifier entered by the user to identify a first transaction that debits or credits funds in the bank account.

13. The method of claim 12, further comprising receiving a second identifier entered by the user to identify a second transaction that debits or credits funds in the bank account, the second identifier being different than the first identifier.

14. The method of claim 1, wherein the personalized transaction identification information includes information other than a date, a check number, and a purchase amount.

15. The method of claim 1, wherein the transaction comprises a transaction to purchase goods and the personalized transaction identification information includes a textual description of the goods.

16. The method of claim 1, wherein the transaction comprises a transaction to purchase goods and the personalized transaction identification information includes a textual description of the provider of the goods.

17. The method of claim 1, wherein the transaction comprises a transaction to purchase services and the personalized transaction identification information includes a textual description of the services.

18. The method of claim 1, wherein the transaction comprises a transaction to purchase services and the personalized transaction identification includes a textual description of the provider of the services.

* * * * *